US011012926B2

(12) United States Patent
Zhang et al.

(10) Patent No.: US 11,012,926 B2
(45) Date of Patent: May 18, 2021

(54) METHODS AND APPARATUS FOR ACQUIRING WIRELESS ACCESS POINTS INFORMATION

(71) Applicant: SHANGHAI SHANGWANG NETWORK TECHNOLOGY CO., LTD., Shanghai (CN)

(72) Inventors: Pei Zhang, Shanghai (CN); Yinglin Cui, Shanghai (CN)

(73) Assignee: SHANGHAI SHANGWANG NETWORK TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/749,962

(22) Filed: Jan. 22, 2020

(65) Prior Publication Data
US 2020/0163007 A1 May 21, 2020

Related U.S. Application Data

(63) Continuation of application No. PCT/CN2018/090059, filed on Jun. 6, 2018.

(30) Foreign Application Priority Data

Jul. 28, 2017 (CN) .......................... 201710631214.2

(51) Int. Cl.
H04W 48/16 (2009.01)
H04W 4/029 (2018.01)
(Continued)

(52) U.S. Cl.
CPC ........... *H04W 48/16* (2013.01); *H04W 4/029* (2018.02); *H04W 12/06* (2013.01); *H04W 84/12* (2013.01)

(58) Field of Classification Search
CPC .... H04W 48/16; H04W 12/06; H04W 41/029
See application file for complete search history.

(56) References Cited

U.S. PATENT DOCUMENTS 8,583,777 B1 11/2013 Boyle et al.
10,111,096 B2 * 10/2018 Cao ........................ H04L 9/3226
(Continued)

FOREIGN PATENT DOCUMENTS

CN 105682015 A 8/2016
CN 105873239 A 8/2016
(Continued)

Primary Examiner — Muthuswamy G Manoharan
(74) Attorney, Agent, or Firm — Kilpatrick Townsend & Stockton, LLP

(57) ABSTRACT

The embodiments of the present application disclose a method and apparatus for acquiring wireless access points information. One specific embodiment of the method comprises: in response to detecting a user operation of initiating a target application, acquiring a Wifi privilege; in response to detecting that the user opening a system interface for displaying a wireless access points information list, acquiring the wireless access points information list; in response to detecting a switch from the system interface for displaying the wireless access points information list to an interface of the target application, presenting the wireless access points information list in the interface of the target application. The embodiment implements displaying the wireless access points information list in the interface of the target application of a terminal device.

8 Claims, 6 Drawing Sheets

(51) Int. Cl.
*H04W 12/06* (2021.01)
*H04W 84/12* (2009.01)

(56) References Cited

U.S. PATENT DOCUMENTS

2009/0207766 A1* 8/2009 Hwang ................. H04W 48/20
370/310
2013/0295962 A1* 11/2013 Manroa ................. H04W 64/00
455/456.3

FOREIGN PATENT DOCUMENTS

CN 106686527 A 5/2017
CN 106973425 A 7/2017

* cited by examiner

METHODS AND APPARATUS FOR ACQUIRING WIRELESS ACCESS POINTS INFORMATION

CROSS REFERENCE TO THE RELATED APPLICATION

This application is the continuation application of International Application No. PCT/CN2018/090059, filed on Jun. 6, 2018, which is based upon and claims priority to Chinese Patent Application No. 201710631214.2, filed on Jul. 28, 2017, the entire contents of which are incorporated herein by reference.

FIELD

The present application relates to communication technology, and more specifically relates to wireless communication technology and in particular relates to methods and apparatus for acquiring wireless access points information.

BACKGROUND OF THE INVENTION

With the development of wireless communication technologies, Wi-Fi (Wireless-Fidelity) networks have become an important way of accessing networks by users in daily life and have brought great convenience to the users. As an example, in some public areas configured with free and open wireless access points (AP), users are able to connect to these free and open wireless access points without having to input passwords. In households, however, private wireless access points are usually configured. These private wireless access points are usually provided with passwords. Users have to input passwords for connecting to these private wireless access points and may only be connected to these private wireless access points after successful authentication.

However, for terminal devices equipped with iOS (a mobile operating system of Apple Inc.), except for particular WiFi connections by installation of description documents, users have to select from a system wireless access points list for wireless access points connection. The system wireless access points list is unable to provide personalized ranking and filtering.

BRIEF SUMMARY OF THE INVENTION

An object of the embodiments of the present application is to provide an improved method and apparatus for acquiring wireless access points information, in order to solve the technical problem mentioned in the above background section.

In a first aspect, the embodiments of the present application provide a method for acquiring wireless access points information, the method comprises: in response to detecting a user operation of initiating a target application, acquiring a Wifi privilege, wherein the Wifi privilege includes a privilege of acquiring a wireless access points information list; in response to detecting that the user opening a system interface for displaying a wireless access points information list, acquiring the wireless access points information list, the wireless access points information including access points identifiers; in response to detecting a switch from the system interface for displaying the wireless access points information list to an interface of the target application, presenting the wireless access points information list in the interface of the target application.

In some embodiments, the method further comprises: in response to receiving a selection operation by the user of wireless access point information in the wireless access points information list presented in the interface of the target application, connecting to a wireless access point indicated by the wireless access point information directed by the selection operation.

In some embodiments, after acquiring a Wifi privilege, the method further comprises: presenting prompt information for indicating the user to open the wireless access points information list in the interface of the target application.

In some embodiments, the wireless access points information further includes a first identifier indicating whether the wireless access point is provided with a password, the first identifier being a yes identifier for indicating that the wireless access point is provided with a password or being a no identifier for indicating that the wireless access point is provided with no password; and after acquiring the wireless access points information list, the method further comprises: generating a first wireless access points information list according to the wireless access points information with a yes identifier as the first identifier in the wireless access points information list; transmitting the first wireless access points information list to a server supporting the target application, the server generating wireless access points information with passwords including the wireless access points information in the first wireless access points information list and retrieved password information; receiving at least one wireless access point information with a password transmitted from the server.

In some embodiments, transmitting the first wireless access points information list to a server supporting the target application, the server generating wireless access points information with passwords including the wireless access points information in the first wireless access points information list and retrieved password information, comprises: dividing the first wireless access points information list into at least one first sub-lists of wireless access points information according to a preset rule; transmitting each of the first sub-list of wireless access points information of the at least one first sub-lists of wireless access points information to the server supporting the target application every preset transmission period, for each wireless access point information in the received first sub-list of wireless access points information, retrieving, by the server, password information corresponding to the wireless access point information in a preset database, and in response to retrieving the password information, generating wireless access point information with a password including the wireless access point information and the retrieved password information.

In some embodiments, after dividing the first wireless access points information list into at least one first sub-lists of wireless access points information according to a preset rule, the method further comprises: acquiring current position information; and transmitting each of the first sub-list of wireless access points information of the at least one first sub-lists of wireless access points information to the server supporting the target application every preset transmission period; for each wireless access point information in the received first sub-list of wireless access points information, retrieving, by the server, password information corresponding to the wireless access point information in a preset database, and in response to retrieving the password information, generating wireless access point information with a password including the wireless access point information and the retrieved password information, comprising: transmitting each of the first sub-list of wireless access points information of the at least one first sub-lists of wireless access points information and the current position information to the server supporting the target application every preset transmission period, for each wireless access point information in the received first sub-list of wireless access points information, retrieving, by the server, password information corresponding to the wireless access point information according to the current position information in the preset database, and in response to retrieving the password information, generating wireless access point information with a password including the wireless access point information and the retrieved password information.

In some embodiments, presenting a wireless access points information list in the interface of the target application comprises: presenting a list of open wireless access points information, a list of encrypted wireless access points information and a list of password-required wireless access points information in the interface of the target application, wherein the list of open wireless access points information includes wireless access points information in the wireless access points information list with a no identifier as the first identifier, the list of encrypted wireless access points information includes wireless access points information in the first wireless access points information list with corresponding password information retrieved in the server, and the list of password-required wireless access points information includes wireless access points information in the first wireless access points information list with no corresponding password information retrieved in the server.

In some embodiments, connecting to a wireless access point indicated by the wireless access point information directed by the selection operation comprises: in response to determining that the first identifier of the wireless access point information directed by the selection operation is a yes identifier, in response to determining that the password information corresponding to the wireless access point information directed by the selection operation has been retrieved, connecting to the wireless access point indicated by the wireless access point information directed by the selection operation according to the password information corresponding to the wireless access point information directed by the selection operation.

In some embodiments, connecting to a wireless access point indicated by the wireless access point information directed by the selection operation further comprises: in response to determining that the password information corresponding to the wireless access point information directed by the selection operation has not been retrieved, presenting a password input control in the target application; in response to receiving a password input by the user in the password input control, connecting to the wireless access point indicated by the wireless access point information directed by the selection operation according to the password input by the user.

In some embodiments, connecting to a wireless access point indicated by the wireless access point information directed by the selection operation further comprises: in response to determining that the first identifier of the wireless access point information directed by the selection operation is a no identifier, connecting to the wireless access point indicated by the wireless access point information directed by the selection operation.

In a second aspect, the embodiments of the present application provide an apparatus for acquiring wireless access points information, the apparatus comprises: a first acquisition unit, configured to, in response to detecting a user operation of initiating a target application, acquire a Wifi privilege, wherein acquiring a Wifi privilege includes a privilege of acquiring a wireless access points information list; a second acquisition unit, configured to, in response to detecting that the user opening a system interface for displaying a wireless access points information list, acquire the wireless access points information list, the wireless access points information including access points identifiers; and a first presentation unit, configured to, in response to detecting a switch from the system interface for displaying the wireless access points information list to an interface of the target application, present the wireless access points information list in the interface of the target application.

In some embodiments, the apparatus further comprises: a connection unit, configured to, in response to receiving a selection operation by the user of wireless access point information in the wireless access points information list presented in the interface of the target application, connect to a wireless access point indicated by the wireless access point information directed by the selection operation.

In some embodiments, the apparatus further comprises: a second presentation unit, configured to present prompt information for indicating the user to open the wireless access points information list in the interface of the target application.

In some embodiments, the wireless access points information further includes a first identifier indicating whether the wireless access point is provided with a password, the first identifier being a yes identifier for indicating that the wireless access point is provided with a password or being a no identifier for indicating that the wireless access point is provided with no password; and the apparatus further comprises: a generation unit, configured to generate a first wireless access points information list according to the wireless access points information with a yes identifier as the first identifier in the wireless access points information list; a transmission unit, configured to transmit the first wireless access points information list to a server supporting the target application, the server generating wireless access points information with passwords including the wireless access points information in the first wireless access points information list and the retrieved password information; and a reception unit, configured to receive at least one wireless access point information with a password transmitted from the server.

In some embodiments, the transmission unit includes: a division module, configured to divide the first wireless access points information list into at least one first sub-lists of wireless access points information according to a preset rule; a transmission module, configured to: transmit each of the first sub-list of wireless access points information of the at least one first sub-lists of wireless access points information to the server supporting the target application every preset transmission period, for each wireless access point information in the received first sub-list of wireless access points information, retrieving, by the server, password information corresponding to the wireless access point information in a preset database, and in response to retrieving the password information, generating wireless access point information with a password including the wireless access point information and the retrieved password information.

In some embodiments, the transmission unit further includes: an acquisition module, configured to acquire current position information; and the transmission module is further configured to: transmit each of the first sub-list of wireless access points information of the at least one first sub-lists of wireless access points information and the current position information to the server supporting the target application every preset transmission period, for each wireless access point information in the received first sublist of wireless access points information, retrieving, by the server, password information corresponding to the wireless access point information according to the current position information in the preset database, and in response to retrieving the password information, generating wireless access point information with a password including the wireless access point information and the retrieved password information.

In some embodiments, the first presentation unit is further configured to: present a list of open wireless access points information, a list of encrypted wireless access points information and a list of password-required wireless access points information in the interface of the target application, wherein the list of open wireless access points information includes wireless access points information in the wireless access points information list with a no identifier as the first identifier, the list of encrypted wireless access points information includes wireless access points information in the first wireless access points information list with corresponding password information retrieved in the server, and the list of password-required wireless access points information includes wireless access points information in the first wireless access points information list with no corresponding password information retrieved in the server.

In some embodiments, the connection unit includes: a first connection module, configured to, in response to determining that the first identifier of the wireless access point information directed by the selection operation is a yes identifier, in response to determining that the password information corresponding to the wireless access point information directed by the selection operation has been retrieved, connect to the wireless access point indicated by the wireless access point information directed by the selection operation according to the password information corresponding to the wireless access point information directed by the selection operation.

In some embodiments, the connection unit further includes: a presentation module, configured to, in response to determining that the password information corresponding to the wireless access point information directed by the selection operation has not been retrieved, present a password input control in the target application; and a second connection module, configured to, in response to receiving a password input by the user in the password input control, connect to the wireless access point indicated by the wireless access point information directed by the selection operation according to the password input by the user.

In some embodiments, the connection unit further includes: a third connection module, configured to, in response to determining that the first identifier of the wireless access point information directed by the selection operation is a no identifier, connect to the wireless access point indicated by the wireless access point information directed by the selection operation.

In a third aspect, the embodiments of the present application provide a terminal device, the terminal device comprises: one or more processors; storage means for storing one or more programs, the one or more programs, when executed by the one or more processors, causing the one or more processors to implement the method as recited in any embodiment of the first aspect.

In a fourth aspect, the embodiments of the present application provide a computer readable storage medium storing computer programs thereon, the computer programs, when executed by a processor, causing the processor to implement the method as recited in any embodiment of the first aspect.

The methods and apparatus for acquiring wireless access point information provided by the embodiments of the present application implement displaying a wireless access points information list in an interface of a target application of a terminal device by: in response to detecting a user operation of initiating the target application, acquiring a Wifi privilege; in response to detecting that the user opening a system interface for displaying the wireless access points information list, acquiring the wireless access points information list; and in response to detecting a switch from the system interface for displaying the wireless access points information list to the interface of the target application, presenting the wireless access points information list in the interface of the target application.

BRIEF DESCRIPTION OF THE DRAWINGS

Other features, objects, and advantages of the present application will become more apparent by reading the detailed description of non-limiting embodiments with reference to the following drawings.

DETAILED DESCRIPTION OF THE INVENTION

Figure 1:
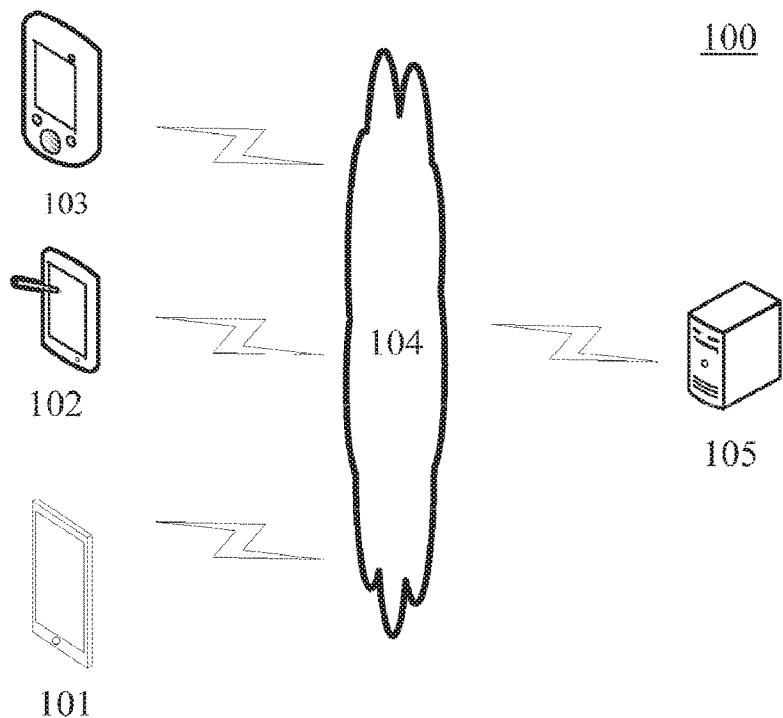
FIG. 1 is an exemplary system architecture diagram in which the present application may be applied.

The following describes the present application in detail with reference to the accompanying drawings and embodiments. It may be understood that the specific embodiments described herein are only used to explain the related invention, but not to limit the invention. It should also be noted that, for convenience of description, only the parts related to the related invention are shown in the drawings.

It should be noted that, in the case of no conflict, the embodiments in the present application and the features in the embodiments may be combined with each other. The application will be described in detail below with reference to the drawings and embodiments.

FIG. 1 illustrates an exemplary system architecture 100 of an embodiment of a method for acquiring wireless access points information or an apparatus for acquiring wireless access points information to which the present application may be applied.

As shown in FIG. 1, the system architecture 100 may include terminal devices 101, 102, and 103, a network 104, and a server 105. The network 104 is a medium for providing a communication link between the terminal devices 101, 102, 103 and the server 105. The network 104 may include various connection types, such as wired, wireless communication links, or fiber optic cables, among others.

The user may use the terminal devices 101, 102, 103 to interact with the server 105 through the network 104 to receive or send messages and the like. Various client applications may be installed on the terminal devices 101, 102, and 103, such as wireless access points information acquisition applications, wireless access points connection applications, web browser applications, shopping applications, search applications, and instant messaging tools, email clients, social platform software, etc.

The terminal devices 101, 102, 103 may be various electronic devices having a display screen and supporting connection to a wireless access point, including but not limited to smart phones, tablets, laptop computers, and desktop computers, etc. As an example, the terminal devices 101, 102, 103 may be various mobile terminal devices having a display screen, supporting connection to a wireless access point, and having an installed operating system of iOS.

The server 105 may be a server that provides various services, such as a background server that provides support for wireless access point connection applications displayed on the terminal devices 101, 102, and 103. The background server may analyze and process the received data such as the wireless access point password information retrieval request, and feed back the processing result (such as the password information corresponding to the wireless access point information) to the terminal device.

It should be noted that the method for acquiring wireless access points information provided by the embodiments of the present application is generally performed by terminal devices 101, 102, and 103. Accordingly, the apparatus for acquiring wireless access points information is generally provided in the terminal devices 101, 102, and 103. In some cases, the method for acquiring wireless access points information provided in the embodiments of the present application may not need the network 104 and the server 105, but may be executed only by the terminal devices 101, 102, and 103. This application is not limited in this aspect.

It should be understood that the numbers of terminal devices, networks, and servers in FIG. 1 are merely exemplary. Depending on the implementation needs, there may be any number of terminal devices, networks, and servers.

Figure 2:
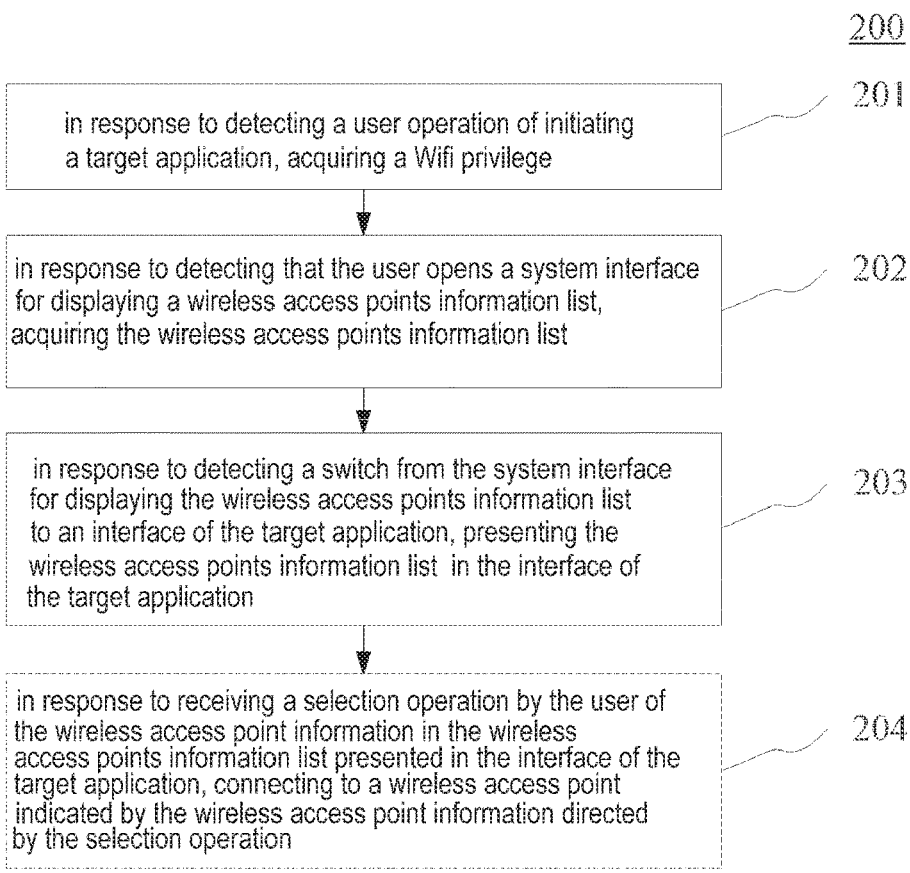
FIG. 2 is a flowchart of an embodiment of a method for acquiring wireless access points information according to the present application.

With continued reference to FIG. 2, a flowchart 200 of an embodiment of a method for acquiring wireless access points information according to the present application is shown. The method for acquiring wireless access points information comprises the following steps:

step 201, in response to detecting a user operation of initiating a target application, a Wifi privilege is acquired.

In this embodiment, an electronic device (for example, a terminal device shown in FIG. 1) on which the method for acquiring wireless access points information runs may acquire a Wifi privilege from an operating system of the electronic device when detecting the user operation of initiating the target application. Wherein the Wifi privilege may include a privilege of acquiring a wireless access points information list.

Optionally, the Wifi privilege may further include a privilege of connecting to wireless access points.

In some optional implementations of this embodiment, the target application may be an application installed in the electronic device for a method for acquiring wireless access points information.

In some optional implementations of this embodiment, in addition to the implementation of the method for acquiring wireless access points information, the target application may further perform other operations, such as connecting to the wireless access points, pushing information, pushing news, instant messaging, and the like.

As an example, the operating system of the electronic device may be iOS. In this way, a Wifi privilege may be acquired in the following way:

<<NEHotspotHelper>>
registerWithOptions:queue:handler( ):bool

In some optional implementations of this embodiment, the electronic device may perform the following operations after step 201 and before step 202: presenting prompt information in the interface of the target application for indicating the user to open the wireless access points information list. In this way, it helps the user to open the system interface for displaying the wireless access points information list as soon as possible, thereby improving the efficiency of connecting to the wireless access points.

Step 202, in response to detecting that the user opening a system interface for displaying the wireless access points information list, a wireless access points information list is acquired.

In this embodiment, after the target application is initiated, the electronic device may detect whether the user has opened the system interface of the electronic device for displaying the wireless access points information list. If it is detected that the user has opened the system interface of the electronic device for displaying the wireless access points information list, the wireless access points information list may be acquired. The wireless access points information list is a list provided by the operating system of the electronic device and includes at least one wireless access point information. Here, the wireless access points information may include an access point identifier. For example, an access point identifier may be a Service Set Identifier (SSID) and/or a Basic Service Set Identifier (BSSID).

Optionally, the wireless access points information may further include signal strength. Since the a Wifi privilege has been acquired from the operating system in step 201, the wireless access points information list may be acquired here after detecting that the wireless access points information list has been opened.

As an example, the operating system of the electronic device may be iOS. In this way, the wireless access points information list may be acquired in the following way:

<<NEHotspotHelperCommand>>
kNeHotspotHelperCommandTypeFilterScanList( )

Step 203, in response to detecting a switch from the system interface for displaying the wireless access points information list to an interface of the target application, the wireless access points information list is presented in the interface of the target application.

In this embodiment, since the user has opened the system interface for displaying the wireless access points information list in step 202, the current display interface of the electronic device is not the interface of the target application in step 202. In order to perform subsequent operations, the user is required to switch from the system interface for displaying the wireless access points information list to the interface of the target application. If it is detected that the current display interface of the electronic device is switched from the system interface for displaying the wireless access points information list to the interface of the target application, the wireless access points information list acquired in step 202 may be presented in the interface of the target application. Thereby, the wireless access points information list is displayed in the interface of the target application instead of the interface provided by the operating system for displaying the wireless access points information list.

As an example, in order to enable the user to switch from the system interface for displaying the wireless access points information list to the interface of the target application, prompt information for prompting the user to return to the interface of the target application after the user opening the system interface for displaying the wireless access points information list may pop up before the user opens the system interface for displaying the wireless access points information list in step 202. In this way, the user will be prompted and the efficiency of making the user return to the interface of the target application will be improved. Alternatively, a notification message may pop up, and the user may switch from the system interface for displaying the wireless access points information list to the interface of the target application by clicking the notification message.

In this embodiment, the electronic device may personally display the wireless access points information list in the interface of the target application in various combinations. As an example, the electronic device may sort the wireless access points information in the wireless access points information list according to the signal strength and display the sorted result, such as displaying the wireless access points information with high signal strengths on the top and displaying the wireless access points information with low signal strengths at the bottom. As an example, the wireless access points information may further include information characterizing whether a wireless access point is provided with a password. In this way, the electronic device may display the wireless access points information of the wireless access points with a password as one category, and display the wireless access points information of the wireless access points without a password as another category.

In some optional implementations of this embodiment, the electronic device may perform the following step 204 after step 203:

Step 204, in response to receiving a selection operation by the user of wireless access point information in the wireless access points information list presented in the interface of the target application, a wireless access point indicated by the wireless access point information directed by the selection operation is connected.

In this embodiment, since the wireless access points information list is already presented in the interface of the target application in step 203, the user may select the wireless access point information of the wireless access point to be connected therein. The electronic device may connect to the wireless access point indicated by the wireless access point information directed by the user's selection operation after receiving a selection operation by the user of wireless access point information in the wireless access points information list presented in the interface of the target application. Since the a Wifi privilege has been acquired from the operating system in step 201, in this way, the electronic device may connect to the wireless access point indicated by the wireless access point information directed by the user's selection operation in the target application.

Figure 3:
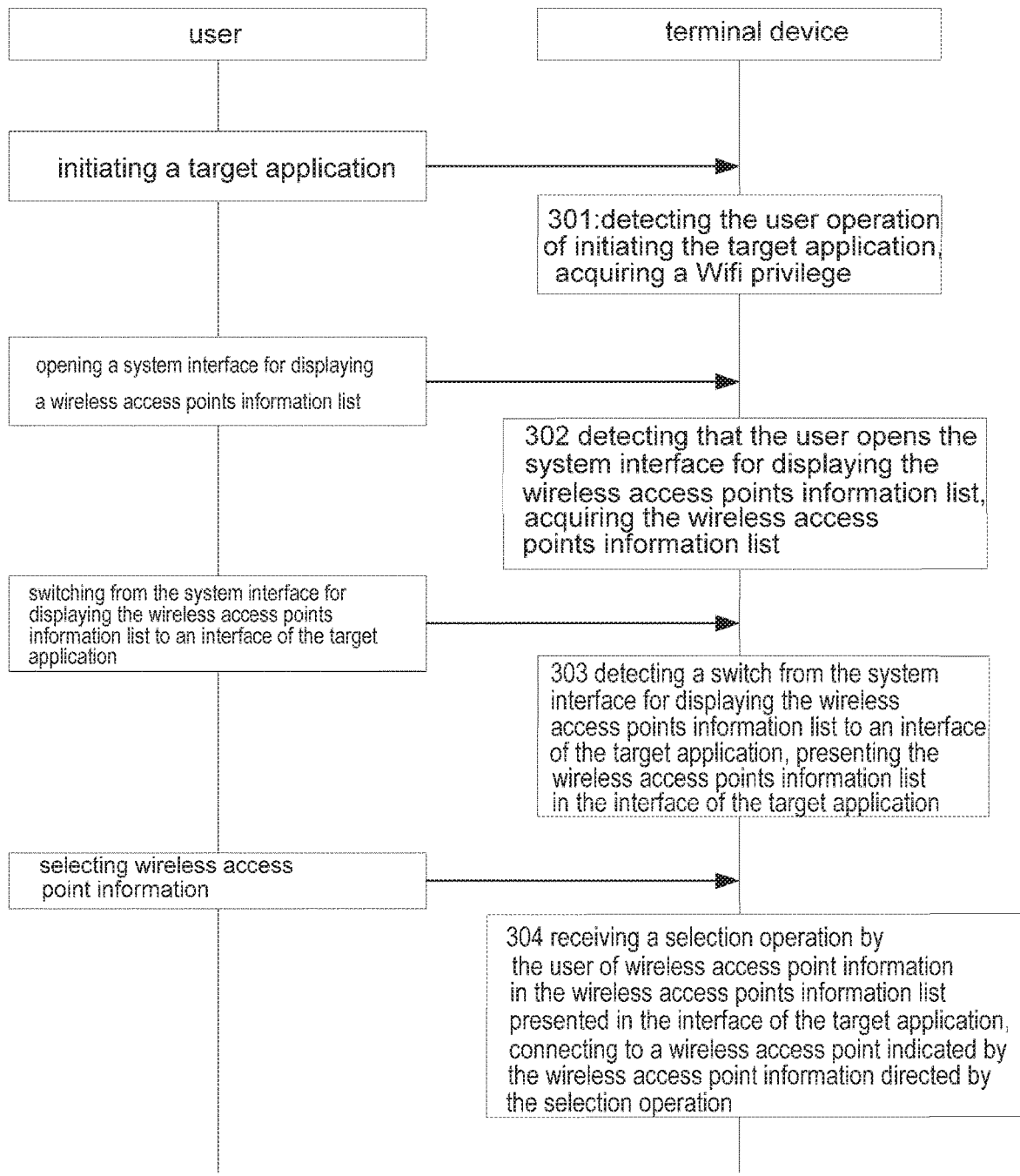
FIG. 3 is a schematic diagram of an application scenario of a method for acquiring wireless access points information according to the present application.

With continued reference to FIG. 3, FIG. 3 is a schematic diagram of an application scenario of a method for acquiring wireless access points information according to the present embodiment. In the application scenario of FIG. 3, the user first initiates a target application on a terminal device. Then in step 301, the terminal device detects the user's operation of initiating the target application, and then a Wifi privilege is acquired. Next, the user opens the system interface displaying the wireless access points information list on the terminal device. Then, in step 302, the terminal device detects that the user opens the system interface for displaying the wireless access points information list, and then the wireless access points information list is acquired. Then, the user switches from the system interface for displaying the wireless access points information list on the terminal device to the interface of the target application. Then in step 303, the terminal device detects a switch from the system interface for displaying the wireless access points information list to the interface of the target application, and presents the wireless access points information list in the interface of the target application. Finally, the user selects the wireless access point information to be connected from the wireless access points information list presented in the interface of the target application of the terminal device. Then in step 304, the terminal device receives a selection operation by the user of wireless access point information in the wireless access points information list presented in the interface of the target application, and connects to a wireless access point indicated by the wireless access point information directed by the selection operation.

The method provided by the above embodiments of the present application implements displaying a wireless access points information list in the interface of the target application of the terminal device by the following: in response to detecting a user operation of initiating the target application, acquiring a Wifi privilege; in response to detecting that the user opening a system interface for displaying the wireless access points information list, acquiring the wireless access points information list; in response to detecting a switch from the system interface for displaying the wireless access points information list to the interface of the target application, presenting the wireless access points information list in the interface of the target application.

Figure 4A:
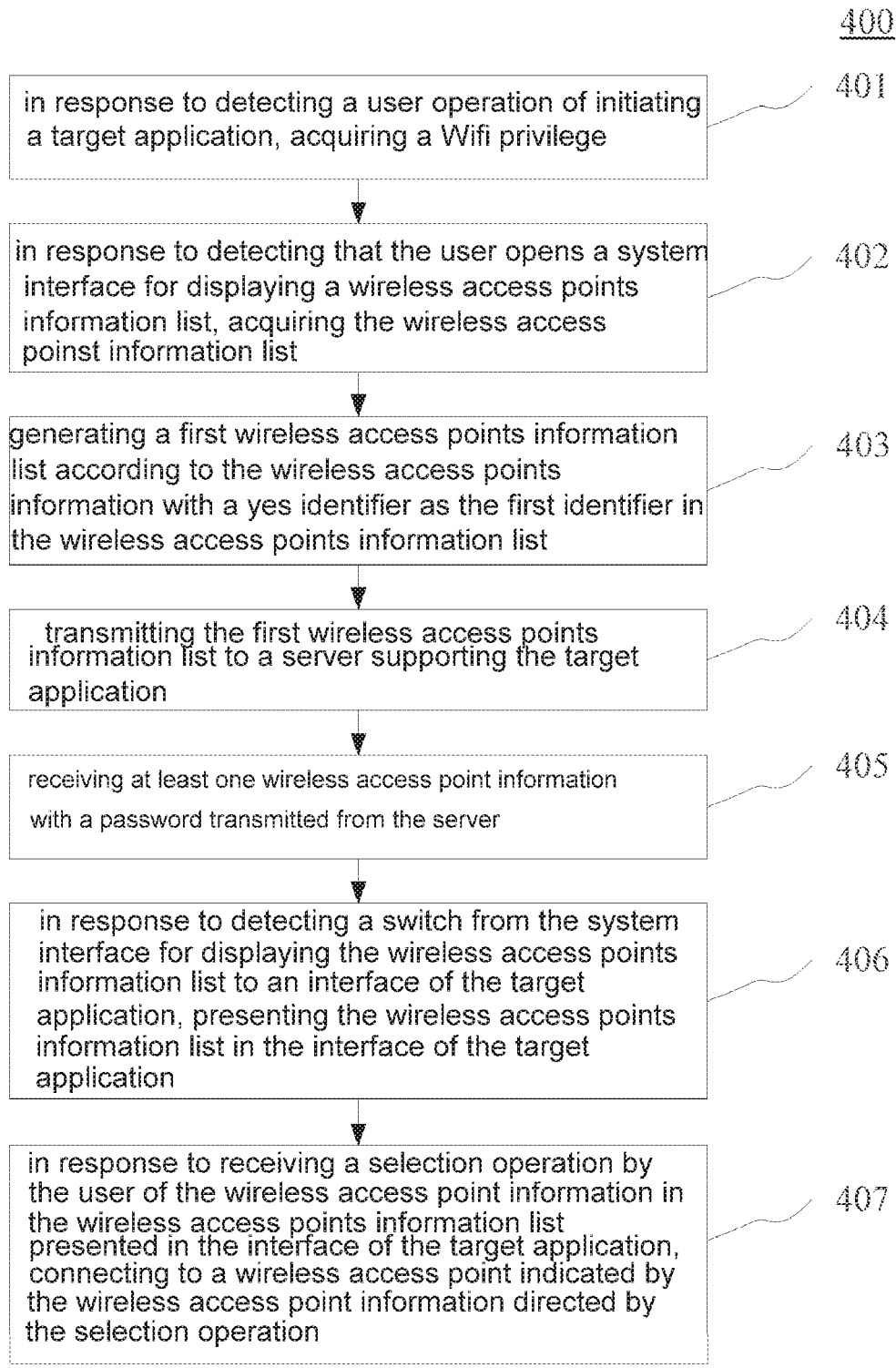
FIG. 4A is a flowchart of another embodiment of a method for acquiring wireless access points information according to the present application.

Further reference is made to FIG. 4A, which illustrates a process 400 of still another embodiment of a method for acquiring wireless access points information. The process 400 of the method for acquiring wireless access points information includes the following steps:

step 401, in response to detecting a user operation of initiating a target application, a Wifi privilege is acquired.

Step 402, in response to detecting that the user opening a system interface for displaying the wireless access points information list, a wireless access points information list is acquired.

In this embodiment, the specific operations of step 401 and step 402 are substantially identical with the operations of step 201 and step 202 in the embodiment shown in FIG. 2, and are thus not repeated here.

In this embodiment, the wireless access points information further includes a first identifier indicating whether the wireless access point is provided with a password, the first identifier may be a yes identifier for indicating that the wireless access point is provided with a password or may be a no identifier for indicating that the wireless access point is provided with no password.

Step 403, a first wireless access points information list is generated according to the wireless access points information with a yes identifier as the first identifier in the wireless access points information list.

In this embodiment, after the electronic device acquires the wireless access point information list, a first wireless access points information list is composed of the wireless access points information with a yes identifier as the first identifier in the wireless access points information list. That is, a wireless access point indicated by each wireless access point information in the generated first wireless access points information list is provided with a password. In order to connect to the wireless access point indicated by any wireless access point information in the first wireless access points information list, corresponding password is required.

Step 404, the first wireless access points information list is transmitted to a server supporting the target application.

In this embodiment, the electronic device may transmit the first wireless access points information list to the server supporting the target application after generating the first wireless access points information list, for each wireless access point information in the received first wireless access points information list, retrieving, by the server, password information corresponding to the wireless access point information in a preset database, and if corresponding password information is retrieved, generating wireless access point information with a password including the wireless access point information and the retrieved password information, and if corresponding password information is not retrieved, wireless access points information with a password will be not be generated. After the server completes retrieval operations on each wireless access point information in the first wireless access points information list, at least one wireless access point information with a password is generated, and the generated at least one wireless access point with a password is returned to the electronic device.

Here, the preset database correspondingly stores wireless access points information and password information, wherein the password information may include a password and an encryption method. As an example, the encryption method may be WPA (Wi-Fi Protected Access), WEP (Wired Equivalent Privacy), or the like.

In some optional implementations of this embodiment, step 404 may also be performed as follows:

firstly, the first wireless access points information list is divided into at least one first sub-lists of wireless access points information according to a preset rule.

As an example, the preset rule may be: dividing the first wireless access points information list into at least one first sub-lists of wireless access points information, wherein the number of wireless access points information in each of the first sub-list of wireless access points information is less than or equals to a first preset number.

As an example, the preset rule may also be: dividing the first wireless access points information list into a second preset number of first sub-lists of wireless access points information, wherein the difference of the number of wireless access points information in any two of the first sub-list of wireless access points information is less than a third preset number.

Then each of the first sub-list of wireless access points information of the at least one first sub-lists of wireless access points information is transmitted to the server supporting the target application every preset transmission period.

In this way, for each wireless access point information in the received first sub-list of wireless access points information, the server retrieves password information corresponding to the wireless access point information in the preset database, and in response to retrieving the password information, generates wireless access point information with a password including the wireless access point information and the retrieved password information.

In some optional implementations of this embodiment, the electronic device may further acquire current position information after dividing the first wireless access points information list into at least one first sub-lists of wireless access points information according to the preset rule. Here, the electronic device may acquire the current position information of the electronic device by for example turning on a positioning function to acquire the current position information. In this way, each first sub-list of wireless access points information of the at least one first sub-lists of wireless access points information being transmitted to the server every preset transmission period may also be performed as follows: each first sub-list of wireless access points information in the at least one first sub-lists of wireless access points information and current position information are transmitted to the server every preset transmission period. Then, for each wireless access point information in the received first sub-list of wireless access points information, the server retrieves password information corresponding to the wireless access point information according to the current position information in the preset database, in response to retrieving the password information, generates wireless access point information with a password including the wireless access point information and the retrieved password information.

Through the foregoing operations of dividing the first wireless access points information list and transmitting them separately, the amount of data transmitted to the server each time may be reduced, thereby speeding up the transmitting speed and improving the user experience.

Step 405, at least one wireless access point information with a password transmitted from the server is received.

Step 406, in response to detecting a switch from the system interface for displaying the wireless access points information list to the interface of the target application, the wireless access points information list is presented in the interface of the target application.

In this embodiment, the specific operation of step 406 may be substantially identical to the operation of step 203 in the embodiment shown in FIG. 2, and details are not described herein again.

In some optional implementations of this embodiment, step 406 may also be performed as follows:

in response to detecting a switch from the system interface for displaying the wireless access points information list to the interface of the target application, a list of open wireless access points information list, a list of encrypted wireless access points information, and a list of password-required wireless access points information are presented in the interface of the target application.

Here, the list of open wireless access points information may include wireless access points information in the wireless access points information list with a no identifier as the first identifier. That is, the wireless access point indicated by each wireless access point information in the list of open wireless access points information is provided with no password. When the electronic device connects to the wireless access point indicated by any wireless access point information in the list of open wireless access points information, it may directly connect to the wireless access point without inputting a password.

Here, the list of encrypted wireless access points information may include wireless access points information in the first wireless access points information list with corresponding password information retrieved in the server. That is, the wireless access point information in the list of encrypted wireless access points information corresponds one-to-one and is identical to the wireless access point information in the at least one wireless access point information with a password received by the electronic device.

For each wireless access point information in the list of encrypted wireless access points information, the password information of the wireless access point information with a password (which is the same as the wireless access point information in the list of encrypted wireless access points information) in the at least one wireless access point information with a password may be determined as the password of the wireless access point indicated by the wireless access point information.

Here, the list of password-required wireless access points information includes wireless access points information in the first wireless access points information list with no corresponding password information retrieved in the server. In other words, for each wireless access point information in the list of password-required wireless access points information, the wireless access point indicated by the wireless access point information is provided with a password but the server has not retrieved password information corresponding to the wireless access point. Therefore, there is no wireless access point information with a password corresponding to the wireless access point information in the at least one wireless access point information with a password received from the server.

By dividing the wireless access points information list into the above three categories and presenting the above three categories in the interface of the target application in accordance with the above three categories, personalized presentation of the wireless access point information may be implemented, thus allowing users to select wireless access point information more conveniently.

Step 407, in response to receiving a selection operation by the user of wireless access point information in the wireless access points information list presented in the interface of the target application, a wireless access point indicated by the wireless access point information directed by the selection operation is connected.

Figure 4B:
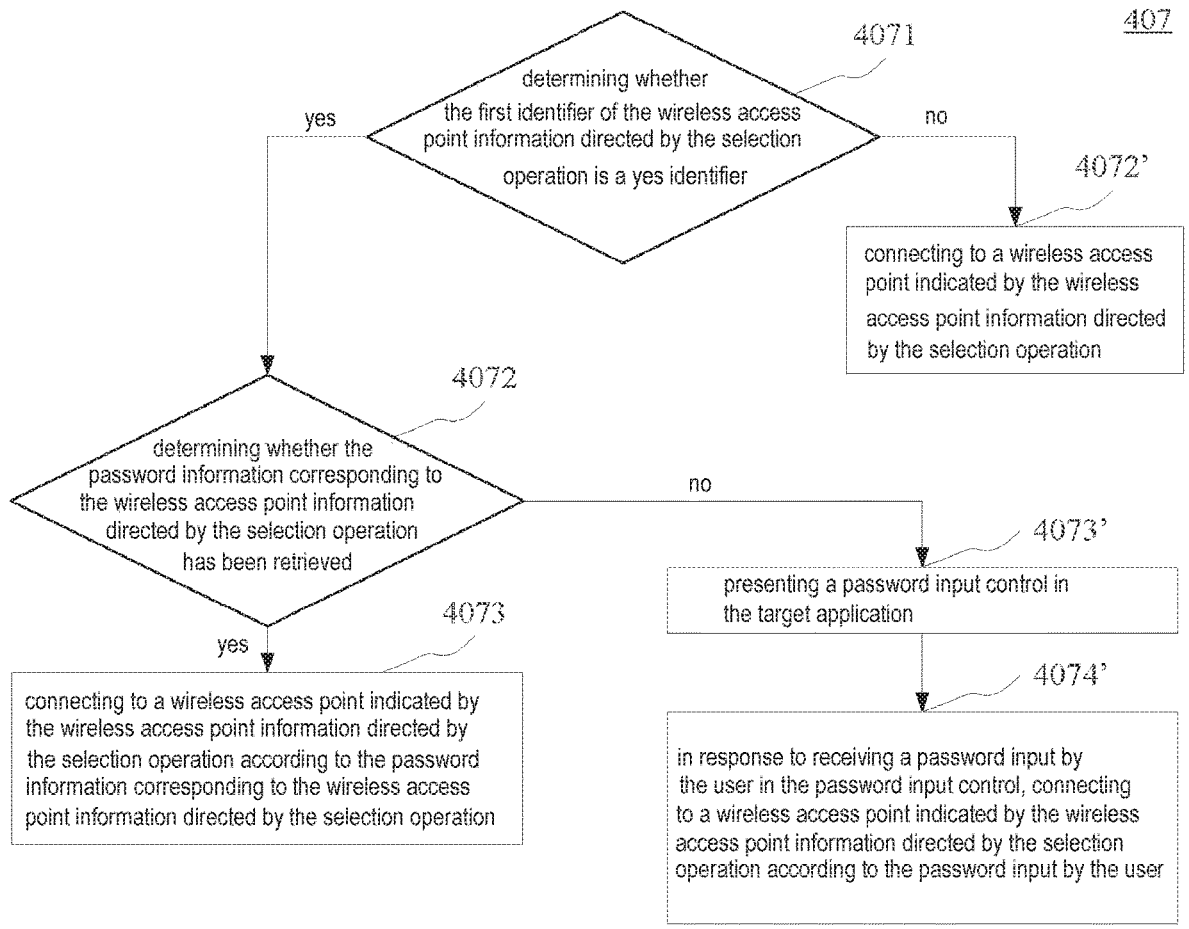
FIG. 4B is an exploded flowchart of step 407 shown in the flowchart of FIG. 4A according to the present application.

In this embodiment, the electronic device may connect to the wireless access point indicated by the wireless access point information directed by the selection operation after receiving the selection operation by the user of wireless access point information in the wireless access points information list presented in the interface of the target application. Specifically, please refer to FIG. 4B, which illustrates sub-step 4071, sub-step 4072, sub-step 4072', sub-step 4073, sub-step 4073' and sub-step 4074' of step 407.

Sub-step 4071, it is determined whether the first identifier of the wireless access point information directed by the selection operation is a yes identifier. If yes, go to sub-step 4072. If no, go to sub-step 4072'.

If it is determined that the first identifier of the wireless access point information directed by the selection operation is a yes identifier which indicates that the wireless access point indicated by the wireless access point information directed by the selection operation is provided with a password, go to sub-step 4072.

If it is determined that the first identifier of the wireless access point information directed by the selection operation is a no identifier which indicates that the wireless access point indicated by the wireless access point information directed by the selection operation is provided with no password, go to sub-step 4072'.

Sub-step 4072', the wireless access point indicated by the wireless access point information directed by the selection operation is connected.

If it is determined in sub-step 4071 that the first identifier of the wireless access point information directed by the selection operation is a no identifier which indicates that the wireless access point indicated by the wireless access point information directed by the selection operation is provided with no password, then the wireless access point indicated by the wireless access point information directed by the selection operation may be directly connected.

Sub-step 4072, it is determined whether the password information corresponding to the wireless access point information directed by the selection operation has been retrieved. If yes, go to sub-step 4073; and if no, go to sub-step 4073'.

If it is determined in sub-step 4071 that the first identifier of the wireless access point information directed by the selection operation is a yes identifier which indicates that the wireless access point indicated by the wireless access point information directed by the selection operation is provided with a password, then it is determined whether the password information corresponding to the wireless access point information directed by the selection operation has been retrieved.

If it is determined that the password information corresponding to the wireless access point information directed by the selection operation has been retrieved, go to sub-step 4073.

If it is determined that the password information corresponding to the wireless access point information directed by the selection operation has not been retrieved, go to sub-step 4073'.

Here, in case that there is wireless access point information with a password in the at least one wireless access point information with a password received from the server which is the same as the wireless access point information directed by the selection operation, it is determined that the password information corresponding to the wireless access point information directed by the selection operation has been retrieved. Otherwise, it is determined that the password information corresponding to the wireless access point information directed by the selection operation has not been retrieved.

Sub-step 4073, the wireless access point indicated by the wireless access point information directed by the selection operation is connected according to the password information corresponding to the wireless access point information directed by the selection operation.

If it is determined in step 4072 that the password information corresponding to the wireless access point information directed by the selection operation has been retrieved, the wireless access point indicated by the wireless access point information directed by the selection operation may be connected according to the password information corresponding to the wireless access point information directed by the selection operation.

Here, the password information of the wireless access point information with a password in the at least one wireless access point information with a password which is the same as the wireless access point information directed by the selection operation is determined as the password information corresponding to the wireless access point information directed by the selection operation.

Sub-step 4073', a password input control is presented in the target application.

If it is determined in step 4072 that the password information corresponding to the wireless access point information directed by the selection operation has not been retrieved, a password input control may be presented in the target application in which the user may input password.

Sub-step 4074', in response to receiving a password input by the user in the password input control, the wireless access point indicated by the wireless access point information directed by the selection operation is connected according to the password input by the user.

Here, if it is received a password input by the user in the password input control, the wireless access point indicated by the wireless access point information directed by the selection operation may be connected according to the password input by the user.

It can be seen from FIG. 4 that, compared with the embodiment corresponding to FIG. 2, the process 400 of the method for acquiring wireless access points information in this embodiment has two more steps of retrieving the password of the wireless access point from the server and connecting to the wireless access point in response to whether a password is provided and whether the password is retrieved. Therefore, the solution described in this embodiment may implement connection to the wireless access point more comprehensively.

Figure 5:
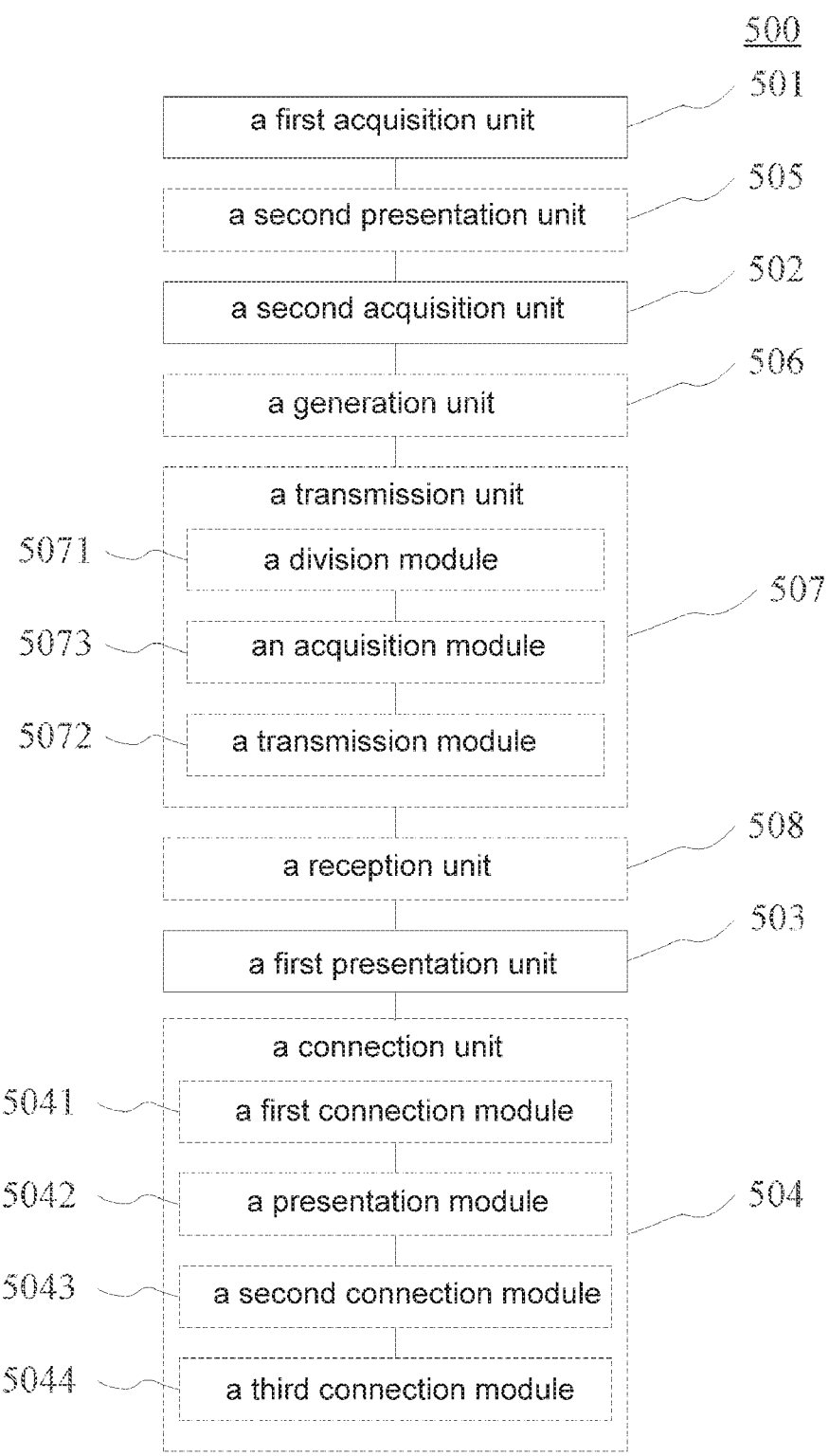
FIG. 5 is a schematic structural diagram of an embodiment of an apparatus for acquiring wireless access points information according to the present application.

With further reference to FIG. 5, as an implementation of the methods shown in the foregoing figures, the present application provides an embodiment of an apparatus for acquiring wireless access points information. This apparatus embodiment corresponds to the method embodiment shown in FIG. 2, and the apparatus may be specifically applied to various electronic devices.

As shown in FIG. 5, the apparatus 500 for acquiring wireless access points information in this embodiment comprises a first acquisition unit 501, a second acquisition unit 502, and a first presentation unit 503. Wherein the first acquisition unit 501 is configured to, in response to detecting a user operation of initiating a target application, acquire a Wifi privilege, wherein the Wifi privilege includes a privilege of acquiring a wireless access points information list. The second acquisition unit 502 is configured to, in response to detecting that the user opening a system interface for displaying the wireless access points information list, acquire the wireless access points information list, the wireless access points information including access points identifiers. The first presentation unit 503 is configured to, in response to detecting a switch from the system interface for displaying the wireless access points information list to an interface of the target application, present the wireless access points information list in the interface of the target application.

In this embodiment, the specific processing of the first acquisition unit 501, the second acquisition unit 502, and the first presentation unit 503 of the apparatus 500 for acquiring wireless access points information and the technical effects brought by it can be made reference to the corresponding descriptions of step 201, step 202, and step 203 respectively in the embodiment in FIG. 2, and details are not described herein again.

In some optional implementations of this embodiment, the apparatus 500 may further comprise a connection unit 504, which is configured to, in response to receiving a selection operation by the user of wireless access point information in the wireless access points information list presented in the interface of the target application, connect to a wireless access point indicated by the wireless access point information directed by the selection operation.

In some optional implementations of this embodiment, the apparatus 500 may further comprise a second presentation unit 505, which is configured to present prompt information for prompting the user to open the wireless access points information list in the interface of the target application.

In some optional implementations of this embodiment, the wireless access points information further includes a first identifier indicating whether the wireless access point is provided with a password, the first identifier being a yes identifier for indicating that the wireless access point is provided with a password or being a no identifier for indicating that the wireless access point is provided with no password; and the apparatus 500 may further comprise: a generation unit 506, which is configured to generate a first wireless access points information list according to the wireless access points information with a yes identifier as the first identifier in the wireless access points information list; a transmission unit 507, which is configured to transmit the first wireless access points information list to a server supporting the target application, the server generating wireless access points information with passwords including the wireless access points information in the first wireless access points information list and the retrieved password information; a reception unit 508, which is configured to receive at least one wireless access point information with a password transmitted from the server.

In some optional implementations of this embodiment, the transmission unit 507 may include: a division module 5071, which is configured to divide the first wireless access points information list into at least one first sub-lists of wireless access points information according to a preset rule; a transmission module 5072, which is configured to transmit each of the first sub-wireless access points information list of the at least one first sub-lists of wireless access points information to the server supporting the target application every preset transmission period; for each wireless access point information in the received first sub-wireless access points information list, retrieving, by the server, password information corresponding to the wireless access point information in a preset database; and in response to retrieving the password information, generating wireless access point information with a password including the wireless access point information and the retrieved password information.

In some optional implementations of this embodiment, the transmission unit 507 may further include: an acquisition module 5073, which is configured to acquire current position information; and the transmission module 5072 may be further configured to: transmit each of the first sub-wireless access points information list of the at least one first sub-lists of wireless access points information and the current position information to the server supporting the target application every preset transmission period; for each wireless access point information in the received first sub-wireless access points information list, retrieving, by the server, password information corresponding to the wireless access point information according to the current position information in the preset database; and in response to retrieving the password information, generating wireless access point information with a password including the wireless access point information and the retrieved password information.

In some optional implementations of this embodiment, the first presentation unit 503 may further configured to: present a list of open wireless access points information, a list of encrypted wireless access points information and a list of password-required wireless access points information in the interface of the target application, wherein the list of open wireless access points information includes wireless access points information in the wireless access points information list with a no identifier as the first identifier, the list of encrypted wireless access points information includes wireless access points information in the first wireless access points information list with corresponding password information retrieved in the server, and the list of password-required wireless access points information includes wireless access points information in the first wireless access points information list with no corresponding password information retrieved in the server.

In some optional implementations of this embodiment, the connection unit 504 may include: a first connection module 5041, which is configured to: in response to determining that the first identifier of the wireless access point information directed by the selection operation is a yes identifier, in response to determining that password information corresponding to the wireless access point information directed by the selection operation has been retrieved, connect to the wireless access point indicated by the wireless access point information directed by the selection operation according to the password information corresponding to the wireless access point information directed by the selection operation.

In some optional implementations of this embodiment, the connection unit 504 may further include: a presentation module 5042, which is configured to, in response to determining that password information corresponding to the wireless access point information directed by the selection operation has not been retrieved, present a password input control in the target application; a second connection module 5043, which is configured to, in response to receiving a password input by the user in the password input control, connect to the wireless access point indicated by the wireless access point information directed by the selection operation according to the password input by the user.

In some optional implementations of this embodiment, the connection unit 504 may further include: a third connection module 5044, which is configured to, in response to determining that the first identifier of the wireless access point information directed by the selection operation is a no identifier, connect to the wireless access point indicated by the wireless access point information directed by the selection operation.

It should be noted that, for implementation details and technical effects of the units in the apparatus for acquiring wireless access points information provided in the embodiments of the present application, reference may be made to descriptions of other embodiments in the present application, and details are not described herein again.

Figure 6:
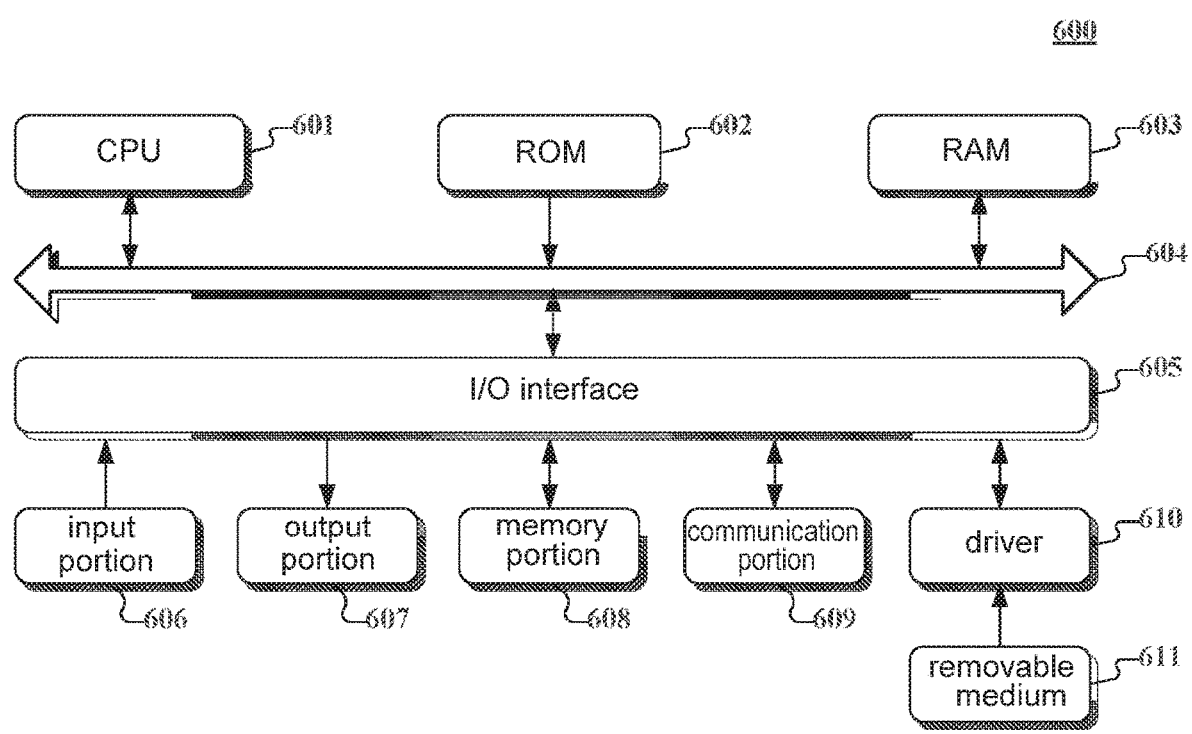
FIG. 6 is a schematic structural diagram of a computer system suitable for implementing a terminal device of the embodiments of the present application.

Reference is now made to FIG. 6, which shows a schematic structural diagram of a computer system 600 suitable for implementing a terminal device according to an embodiment of the present application. The terminal device shown in FIG. 6 is merely an example, and should not impose any limitation on the functions and scope of use of the embodiments of the present application.

As shown in FIG. 6, the computer system 600 includes a central processing unit (CPU) 601, which can perform various appropriate actions and processing according to the programs stored in a read-only memory (ROM) 602 or programs loaded from a storage portion 608 into a random access memory (RAM) 603. In the RAM 603, various programs and data necessary for the operation of the system 600 are also stored. The CPU 601, ROM 602, and RAM 603 are connected to each other via a bus 604. An input/output (I/O) interface 605 is also connected to the bus 604.

The following components are connected to the I/O interface 605: an input portion 606 including a touch screen, a stylus, etc.; an output portion 607 including cathode ray tubes (CRT), liquid crystal displays (LCD), touch screens, etc. and speakers; a storage portion 608 including a hard disk, etc.; and a communication portion 609 including a network interface card such as a LAN (Local Area Network) card, a modem, and the like. The communication portion 609 performs communication processing via a network such as the Internet. Drivers 610 are also connected to the I/O interface 605 when necessary. Removable medium 611, such as a magnetic disk, an optical disk, a magnetic-optical disk, a semiconductor memory, etc. is stalled on the drivers 610 when necessary, so that a computer program read out therefrom is installed into the memory portion 608.

In particular, according to the embodiments of the present disclosure, the processes described above with reference to the flowcharts may be implemented as computer software programs. For example, embodiments of the present disclosure include a computer program product including a computer program carried on a computer-readable medium, the computer program containing program code for performing a method shown in a flowchart. In such an embodiment, the computer program may be downloaded from a network through the communication portion 609 and installed, and/or installed from the removable medium 611. When the computer program is executed by the central processing unit (CPU) 601, the above functions defined in the method of the present application are performed. It should be noted that the computer-readable medium described in the present application may be a computer-readable signal medium or a computer-readable storage medium or any combination of the above two.

The computer-readable storage medium may be, for example, but not limited to, an electronic, magnetic, optical, electromagnetic, infrared, or semiconductor system, apparatus, or device, or any combination thereof. More specific examples of computer-readable storage media may include, but are not limited to: electrical connections with one or more wires, portable computer magnetic disks, hard disks, random access memory (RAM), read-only memory (ROM), erasable Programming read-only memory (EPROM or flash memory), optical fiber, portable compact disk read-only memory (CD-ROM), optical storage device, magnetic storage device, or any suitable combination of the foregoing. In the present application, a computer-readable storage medium may be any tangible medium that contains or stores a program that can be used by or in combination with an instruction execution system, apparatus, or device. In the present application, a computer-readable signal medium may include a data signal that is included in a baseband or propagated as part of a carrier wave, and which carries computer-readable program code. Such a propagated data signal may take many forms, including but not limited to electromagnetic signals, optical signals, or any suitable combination of the foregoing.

The computer-readable signal medium may also be any computer-readable medium other than a computer-readable storage medium, and the computer-readable medium may send, propagate, or transmit a program for use by or in connection with an instruction execution system, apparatus, or device. Program code embodied on a computer-readable medium may be transmitted using any appropriate medium, including but not limited to: wireless, wired, optical fiber cable, RF, etc., or any suitable combination of the foregoing.

The flowchart and block diagrams in the accompanying drawings illustrate the architecture, functionality, and operation of possible implementations of systems, methods and computer program products according to various embodiments of the present application. In this regard, each block in the flowchart or block diagram may represent a module, a program segment, or a part of code, a portion of which contains one or more executable instructions for implementing a specified logical function. It should also be noted that in some alternative implementations, the functions labeled in the blocks may also occur in a different order than those labeled in the drawings. For example, two successively represented blocks may actually be executed substantially in parallel, and they may sometimes be executed in a reverse order, depending on the functions involved. It should also be noted that each block in the block diagrams and/or flowcharts, and combinations of blocks in the block diagrams and/or flowcharts, can be implemented by a dedicated hardware-based system that performs the specified function or operation, or it can be implemented with a combination of dedicated hardware and computer instructions.

The units described in the embodiments of the present application may be implemented by software or hardware. The described unit may also be provided in a processor, for example, it may be described as: a processor including a first acquisition unit, a second acquisition unit, and a first presentation unit. The name of these units does not constitute a limitation on the unit itself in some cases. For example, the second acquisition unit may also be described as a "unit for acquiring a wireless access points information list".

As another aspect, the present application further provides a computer-readable medium, which may be included in the apparatus described in the foregoing embodiments; or may exist alone without being assembled into the apparatus. The computer-readable medium carries one or more programs. When the one or more programs are executed by the apparatus, the apparatus is caused to: in response to detecting a user operation of initiating a target application, acquire a Wifi privilege, wherein acquiring the Wifi privilege includes a privilege of acquiring a wireless access points information list; in response to detecting that the user opening a system interface for displaying the wireless access points information list, acquire the wireless access points information list, the wireless access points information including access points identifiers; in response to detecting a switch from the system interface for displaying the wireless access points information list to an interface of the target application, present the wireless access points information list in the interface of the target application.

The above description is only a embodiment of the present application and an explanation of the technical principles applied. Those skilled in the art should understand that the scope of the invention involved in the present application is not limited to the technical solution composed of a specific combination of the above-mentioned technical features, but should also cover other technical solutions formed by any arbitrary combination of the above-mentioned technical features or their equivalents without departing from the above inventive concept. For example, a technical solution formed by replacing the technical features disclosed (but not limited to) in the present application with technical features having similar functions.

What is claimed is:

1. A method for acquiring wireless access points information, the method comprising:
   in response to detecting a user operation of initiating a target application, acquiring a Wifi privilege, wherein the Wifi privilege includes a privilege of acquiring a wireless access points information list;
   in response to detecting that the user opening a system interface for displaying a wireless access points information list, acquiring the wireless access points information list, the wireless access points information including access points identifiers, wherein the wireless access points information further includes a first identifier indicating whether the wireless access point is provided with a password, the first identifier being a yes identifier for indicating that the wireless access point is provided with a password or being a no identifier for indicating that the wireless access point is provided with no password;
   generating a first wireless access points information list according to the wireless access points information with a yes identifier as the first identifier in the wireless access points information list;
   transmitting the first wireless access points information list to a server supporting the target application, the server generating wireless access points information with passwords including the wireless access points information in the first wireless access points information list and retrieved password information, including:
   dividing the first wireless access points information list into at least one first sub-lists of wireless access points information according to a preset rule; and
   transmitting each of the first sub-list of wireless access points information of the at least one first sub-lists of wireless access points information to the server supporting the target application every preset transmission period, for each wireless access point information in the received first sub-list of wireless access points information, retrieving, by the server, password information corresponding to the wireless access point information in a preset database and in response to retrieving the password information, generating wireless access point information with a password including the wireless access point information and the retrieved password information;
   receiving at least one wireless access point information with a password transmitted from the server;
   in response to detecting a switch from the system interface for displaying the wireless access points information list to an interface of the target application, presenting the wireless access points information list in the interface of the target application;
   in response to receiving a selection operation by the user of wireless access point information in the wireless access points information list presented in the interface of the target application, connecting to a wireless access point indicated by the wireless access point information directed by the selection operation, including:
   in response to determining that the first identifier of the wireless access point information directed by the selection operation is a yes identifier, in response to determining that the password information corresponding to the wireless access point information directed by the selection operation has been retrieved, connecting to the wireless access point indicated by the wireless access point information directed by the selection operation according to the password information corresponding to the wireless access point information directed by the selection operation.

2. The method as recited in claim 1, wherein after acquiring a Wifi privilege, the method further comprising:
   presenting prompt information for indicating the user to open the wireless access points information list in the interface of the target application.

3. The method as recited in claim 1, wherein after dividing the first wireless access points information list into at least one first sub-lists of wireless access points information according to a preset rule, the method further comprising:
   acquiring current position information; and the step of transmitting each of the first sub-list of wireless access points information of the at least one first sub-lists of wireless access points information to the server supporting the target application every preset transmission period, for each wireless access point information in the received first sub-list of wireless access points information, retrieving, by the server, password information corresponding to the wireless access point information in a preset database and in response to retrieving the password information, generating wireless access point information with a password including the wireless access point information and the retrieved password information, including:

transmitting each of the first sub-list of wireless access points information of the at least one first sub-lists of wireless access points information and the current position information to the server supporting the target application every preset transmission period, for each wireless access point information in the received first sub-list of wireless access points information, retrieving, by the server, password information corresponding to the wireless access point information according to the current position information in the preset database and in response to retrieving the password information, generating wireless access point information with a password including the wireless access point information and the retrieved password information.

4. The method as recited in claim 3, wherein the step of presenting the wireless access points information list in the interface of the target application comprising:

presenting a list of open wireless access points information, a list of encrypted wireless access points information and a list of password-required wireless access points information in the interface of the target application, wherein the list of open wireless access points information includes wireless access points information in the wireless access points information list with a no identifier as the first identifier, the list of encrypted wireless access points information includes wireless access points information in the first wireless access points information list with corresponding password information retrieved in the server, and the list of password-required wireless access points information includes wireless access points information in the first wireless access points information list with no corresponding password information retrieved in the server.

5. The method as recited in claim 1, wherein the step of connecting to a wireless access point indicated by the wireless access point information directed by the selection operation, further comprising:

in response to determining that the password information corresponding to the wireless access point information directed by the selection operation has not been retrieved, presenting a password input control in the target application; and in response to receiving a password input by the user in the password input control, connecting to the wireless access point indicated by the wireless access point information directed by the selection operation according to the password input by the user.

6. The method as recited in claim 5, wherein the step of connecting to a wireless access point indicated by the wireless access point information directed by the selection operation, further comprising:

in response to determining that the first identifier of the wireless access point information directed by the selection operation is a no identifier, connecting to the wireless access point indicated by the wireless access point information directed by the selection operation.

7. A terminal device, comprising:

one or more processors;

storage means for storing one or more programs, wherein the one or more programs, when executed by the one or more processors, causing the one or more processors to implement the method as recited in claim 1.

8. A computer readable storage medium storing computer programs thereon, the computer programs, when executed by a processor, causing the processor to implement the method as recited in claim 1.

* * * * *